United States Patent [19]

Graham et al.

[11] Patent Number: 4,631,308

[45] Date of Patent: Dec. 23, 1986

[54] ADHESIVE AND COATING COMPOSITION

[75] Inventors: Stephen L. Graham, Clute; David O. Plunkett, Lake Jackson; Robert S. Lacey, Angleton, all of Tex.

[73] Assignee: The Dow Chemical Company, Midland, Mich.

[21] Appl. No.: 736,041

[22] Filed: May 20, 1985

Related U.S. Application Data

[63] Continuation-in-part of Ser. No. 528,754, Sep. 1, 1983.

[51] Int. Cl.$^4$ .............................................. C08F 91/06
[52] U.S. Cl. .................................. 524/272; 524/487; 524/488; 524/489; 428/523
[58] Field of Search ................. 524/272, 487, 488, 489

[56] References Cited

U.S. PATENT DOCUMENTS

| | | | |
|---|---|---|---|
| 3,264,272 | 8/1966 | Rees | 260/78.5 |
| 3,520,861 | 7/1970 | Thompson | 526/317 |
| 4,132,690 | 1/1979 | Ernstmann | 524/488 |

*Primary Examiner*—Paul R. Michl
*Attorney, Agent, or Firm*—Bruce M. Kanuch

[57] ABSTRACT

A hot melt adhesive and coating composition is provided comprising a copolymer of ethylene and acrylic acid or methacrylic acid; a compatible wax and a tackifier. The copolymer characterized as having a melt flow of at least about 0.77 and an acrylic acid or methacrylic acid content such that the copolymer has an acid number ranging from about 8 to about 93.

14 Claims, 1 Drawing Figure

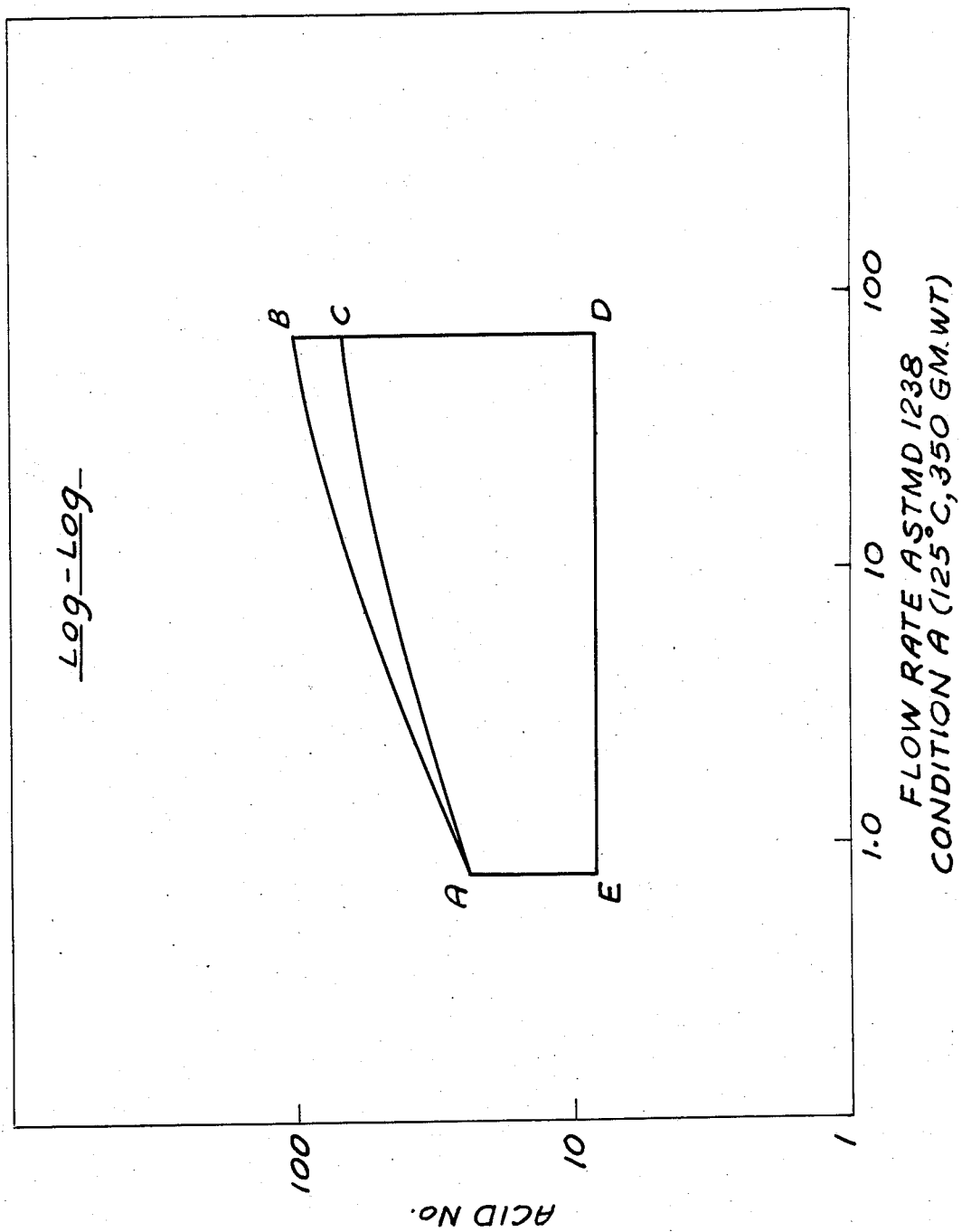

ADHESIVE AND COATING COMPOSITION

CROSS-REFERENCE TO RELATED APPLICATIONS

This application is a continuation-in-part of the copending application Ser. No. 528,754, filed Sept. 1, 1983.

BACKGROUND OF THE INVENTION

Many normally solid heat-activatable ethylene based interpolymers (e.g., co- and terpolymers) have been developed which are useful as hot melt adhesives and as coatings. These include copolymers of ethylene and vinyl acetate; ethylene and acrylic acid, ethylene and methacrylic acid and the like. These polymers are usually mixed with various waxes and tackifiers to form combinations which provide adhesives and coatings which are strong, tough and provide adhesion to a variety of substrates (polar and nonpolar, porous and non-porous). However, it has always been a problem in this art in providing a copolymer of ethylene and acrylic acid which not only functioned well as an adhesive and coatings but also was compatible with a wide range of waxes and tackifiers which are employed to improve the adhesive and coating properties of the base resin (e.g., ethylene acrylic acid).

Applicants have discovered an ethylene acrylic acid copolymer which not only provides good hot melt adhesive properties, is good for coating various substrates, and also is compatible with a wide variety of waxes and tackifiers known in the art.

SUMMARY OF THE INVENTION

This invention comprises a hot melt adhesive composition comprising a normally solid heat-activatable ethylene-acrylic acid (or -methacrylic acid) copolymer characterized as falling within the boundaries defined by the trapezoidal figure of the drawing wherein points A, B, C, D and E define the boundaries, a compatable wax from about 10 to about 40 percent by weight and a compatable tackifier from about 10 to about 40 percent by weight. Point A represents a copolymer having an acid number (hereinafter defined) of about 23 (mg KOH/g) and a flow rate of about 0.77 gm/10 min.; Point B is a copolymer having an acid number of about 93 and a flow rate of about 69 gm/10 min.; Point C is a copolymer having an acid number of about 65 and a flow rate of about 69 gm/10 min.; Point D is a copolymer having an acid number of about 8 and a flow rate of about 69 gm/10 min.; and Point E is a copolymer having an acid number of about 8 and a flow rate of about 0.77 gm/10 min. The preferred copolymers are those falling within the boundaries defined by Points A, C, D and E.

Flow rate, as used herein, is determined by ASTM Method D-1238-70, Procedure A, Condition A. As the flow rate of the copolymer is increased the acid number of the resin may also be increased. Thus, at an acid number of about 8 to about 23 the flow rate should be at a minimum of about 0.77 while at an acid number of about 93 the melt flow may range up to about 69.

Acid number, as employed herein, is determined by the method described in U.S. Pat. No. 4,132,690 (Column 3, line 53 through Column 4, line 16), the teachings of which are specifically incorporated herein by reference.

The above-described compositions can be employed in hot melt adhesive applications such as, for example, in case sealing, bag making, tray forming, overlap paper laminations, book binding, disposable non-wovens, fusable interfacing and interliners, composite tube assemblies, pallet stabilizations, heat sealable labels and tapes and the like. The compositions can also be employed as protective coatings such as in paper board liquid containers and the like.

REFERENCE TO DRAWINGS

The drawing depicts the region which characterizes the scope of the claimed invention in terms of flow rate and acid content of the copolymer. The drawing is based on a log-log graph. The copolymers are those contained within the boundaries of the trapezoidal figure defined by Points A, B, C, D and E.

DETAILED DESCRIPTION OF THE INVENTION

The copolymer can be prepared in any convenient manner. For example, it can be produced by polymerization techniques which produce a random copolymer of ethylene and acrylic (methacrylic) acid such as taught in U.S. Pat. No. 4,351,931 and 3,520,861. The copolymer can also be produced by graft polymerization techniques such as taught in U.S. Pat. No. 3,177,269. The teachings of these patents are specifically incorporated herein by reference. The copolymers may be treated to neutralize some or all of the acid groups with a metal ion such as an alkali metal ion. The neutralized copolymers are referred to in the art as ionomers.

The hot melt formulation can be mixed with a wide range of waxes and tackifiers to provide a composition having good compatibility. By good compatability it is meant that there is limited phase separation of the different constituents at a temperature of about 22° C. to about 232° C., preferably limited separation at a temperature of about 120° C. to about 232° C. for at least 24 hours and more preferably for at least 72 hours. This makes the composition useful in a wide range of applications where various specific characteristics are desired.

Tackifiers are those materials which improve the adhesion properties of the compositions. Tackifiers based on hydrogenated rosin esters, rosin esters, dibasic acid rosin esters, hydrogenated rosen, terpene hydrocarbons, terpene phenolics, aromatic hydrocarbons, aliphatic hydrocarbons. Examples of these materials are taught in U.S. Pat. No. 4,018,733, Column 3, lines 23-68, and glycerol esters of fumarate-modified resin as described in U.S. Pat. No. 3,787,346, the teachings of which are specifically incorporated herein by reference.

The tackifier is used to promote adhesion or modify the viscosity of the composition. The tackifier ranges from about 10 to about 40 percent by weight of the hot melt composition.

Various waxes are employed in hot melt adhesives primarily as diluents, viscosity modifiers, softening point modifiers and the like. Petroleum waxes such as paraffins and microcrystalline waxes and synthetic waxes such as Fischer-Tropsch wax, or polyethylene waxes described in U.S. Pat. Nos. 2,504,400; 2,683,141 and 2,712,534 are useful. The teaching of these patents are specifically incorporated herein by reference. For example, waxes based on polyethylene, oxidized polyethylene, paraffin, oxidized paraffin, oxidized hydrocarbons, and various synthetic waxes such as Polywax 655

(a polyethylene wax from Barreco); Allied 629 (an oxidized polyethylene wax from Allied Chemical); 180M (a microcrystalline wax from Witco); B120 (an oxidized paraffin wax from Durachem) Efton D-Super (an oxidized hydrocarbon wax from Durachem); Cardipol LP (a synthetic wax from Barreco) are useful. The wax is employed in an amount ranging from about 10 to about 40 percent, by weight of the composition.

Other additives such as pigments, fillers, processing oils, and the like can be included.

The various additions can be blended with the copolymer in any suitable manner (batch or continuous) for example, by melt blending in a stirred vessel.

The compositions of the present invention can be adhered to various substrates employing delivery systems such as extruders, gear pumps, piston pumps, handguns, and as a powder, through slot dies, nozzles (single or multihead) and various other methods. The adhesive compositions can be applied to a substrate at an elevated temperature, e.g., of about 90° C., preferably from about 93° C. to 232° C., most preferably at about 177° C. The composition provides good adhesion to substrates such as treated and untreated polyolefins, polyester films, paper, metallic substrates (e.g., aluminum, steel, copper) glass, cellophane, leather, nylon and the like. Similar and dissimilar materials can be bonded together employing the composition of the present invention. The composition is used as an adhesive by applying sufficient heat to a layer of the composition and applying a second substrate or the composition can be cooled and can be employed as a protective coating on nonporous and porous substrates, for example, on cake mix boxes, milk cartons, ice cream containers, margarine wrappers, food trays, paper and foil bags, disposable diapers, protective overwraps and the like. When employed as a coating, a laminate is formed containing the solid substrate and a uniform layer of the composition.

EXAMPLE 1

Four different ethylene-acrylic acid copolymers were prepared by a constant state, continuous free radical, random polymerization process as described in U.S. Pat. Nos. 3,520,861 and 4,351,931. They differed in their physical properties, e.g., flow rate, acid number, and density. These properties were controlled by controlling the process conditions. For example, the flow rate was controlled by varying the temperature and pressure of the reaction.

Various physical properties of the four copolymers were determined. These are reported in the following Table I.

TABLE I

| Properties | ASTM Method | Copolymer A | B | C | D |
|---|---|---|---|---|---|
| Acrylic Acid* % by weight | | 3.08 | 3.49 | 9.45 | 5.84 |
| Flow Rate gm/10 minutes | D-1238 Condition A | 0.97 | 3.94 | 4.33 | 20.0 |
| Melt Index** gm/10 minutes | D-1238 Condition E | 100 | 580 | 726 | 2600 |
| Density gm/cc | D-792 | 0.921 | 0.919 | 0.932 | 0.922 |
| Tensile Ultimate psi | D-632 | 980 | 850 | 1200 | 700 |
| Elongation % | D-638 | 365 | 175 | 525 | 150 |
| 2% Secant Modulus | D-790 | 13000 | 12000 | 9100 | 9500 |

TABLE I-continued

| Properties | ASTM Method | Copolymer A | B | C | D |
|---|---|---|---|---|---|
| psi | | | | | |
| Hardness Shore A | D-2240 | 95 | 95 | 95 | 95 |
| Low Temperature Brittle Point, °C. | D-746 | −33 | −23 | −20 | >−20 |
| Izod Impact (−50° C.) | D-256 | 0.41 | 0.38 | 0.28 | — |
| Vicat Softening °C. | D-1525 | 77.3 | 74 | 63 | 60 |
| Ring & Ball Softening °F. | E-28 | 242 | 228 | 215 | — |
| Brookfield Viscosity cps (176.7° C.) | | 85,200 | 43,000 | 23,400 | 6,950 |

*These can be converted to acid numbers by using known mathematical conversion factors. The conversion factor is 7.78. The percent by weight multiplied by 7.78 will yield the acid number.
**Calculated approximate melt indexes ASTM D-1238 Condition E (190° C. under 2160 grams total load).

EXAMPLE 2

The adhesive properties of Resins A, B and C described in Example 1 were determined by applying approximately a three-sixteenth inch bead of hot melt adhesive formulation onto various substrates using a Meltex brand hot melt gun and a rotating table. By varying the speed of rotation of the table, air pressure employed to discharge the adhesive and orifice size of the hot melt gun, a relatively constant bead weight (bead size) was applied at an operating temperature of 400° F. (204° C.). Immediately following the application of the bead to one substrate, a second substrate of the same material as the first was laminated to the first using a 440 gram weight.

The force required to pull the two substrates apart was then determined employing an Instron Tensile Tester (Model 1123) after a period of 24 hours.

The type of substrate employed and the results of these tests are set forth in the following Table II.

TABLE II

| | Peel Strength (pounds/inch width) | | |
|---|---|---|---|
| Substrate | Resin A | Resin B | Resin C |
| Kraft Paper (50 lbs/ream) | 2.02* | 2.44* | 2.45* |
| Aluminum Foil (2 mil) | 0.79 | 1.40 | 1.59 |
| Nylon[1] (1.0 mil) | 0.16 | 0.30 | 1.11 |
| LDPE[2] (1.5 mil) | 1.57 | 1.50 | 1.46 |

*The substrate failed before the adhesive.
[1]Nylon - commercial Nylon 6 purchased from Allied Chemical.
[2]LDPE - a 2 melt index homopolymer of polyethylene having a density of 0.922.

EXAMPLE 3

Tests were conducted by preparing samples using the hot melt gun described in Example 2. The adhesive was extruded from the nozzle onto one end of the substrate, then the end of another substrate was pressed onto the adhesive. Samples were then tested on an Instron Tensile Tester (Model 1123) equipped with an environment chamber. The area of the adhered portion was measured and the lap shear strength was calculated for each sample. The substrate consisted of one-inch wide birch (⅛ inch thick) wood. The resins consisted of Resins A, B and C as reported in Example 1. The results are set forth in the following Table III.

TABLE III

| Temperature at Which Test Was Conducted | Lap Shear Adhesion (psi) | | |
|---|---|---|---|
| | Resin A | Resin B | Resin C |
| 72° F. (22° C.) | 117 | 164 | 284 |
| 150° F. (65.6° C.) | 61 | 62 | 91 |

EXAMPLE 4

The compatibility of resins A, B and C as reported in Example 1 with various commercially available tackifiers and waxes was determined by observation of phase separation and increase in viscosity, if any. The tests were conducted by placing a 50/50 weight ratio of resin and wax and/or tackifier in a forced air oven at 350° F. (176.7° C.). The samples were allowed to sit in the oven for 1-1.5 hours and then stirred. They were then allowed to sit in the oven for a period of from about 12 to about 18 hours. The samples were then examined for phase separation (i.e., separation into two or more layers). Using a glass stirring rod, the viscosity of the hot mixture was examined (visually and physically) for any significant increase or decrease in viscosity over the sample as originally mixed and stirred after a period of 1 to 1.5 hours. Those mixtures where phase separation occurred or those which thickened significantly, were determined to be incompatible. It was found that the resins were compatible with the following materials.

TABLE IV

| Tackifiers | Waxes |
|---|---|
| Rosin Esters - Hydrogenated | Polyethylene |
| Foral 85[1] | Polywax 655[6] |
| Staybellite Ester 10[1] | Epolene C-16[7] |
| Staybellite Ester 5[1] | Epolene D-43[7] |
| Foral 105[1] | Epolene N-10[7] |
| Staybellite[1] | Oxidized Polyethylene |
| Rosin Esters | Vestowax AW-1050[8] |
| Pentalyn 344[1] | Vestowax AO-1699[8] |
| Rosin Esters - Dibasic Acid | Vestowax AS-1551[8] |
| Cellolyn 21[1] | 629[10] |
| Rosin-Hydrogenated | 655[10] |
| Pexalyn A600[1] | 316[10] |
| Pexalyn A500[1] | Polywax E-2020[6] |
| Terpene Hydrocarbons | Microcrystalline |
| Wingtack 95[4] | Amber Ultraflex[6] |
| Zonatac 105[3] | Victory[6] |
| Piccolyte A125[1] | Starwax 100[6] |
| Piccolyte S125[1] | Be Square 195[6] |
| Terpene Phenolic | Fortex[6] |
| Piccofyn A135[1] | 180-M[9] |
| Aromatic Hydrocarbons | Paraffin |
| Cumar P-25[2] | 140/45[11] |
| Aliphatic Hydrocarbons | Oxidized Paraffin |
| Escorez 1310[5] | Durachem B120[8] |
| Escorez 2101[5] | Oxidized Hydrocarbon |
| | Duroxon R-21[8] |
| | Efton D-Super[8] |
| | Synthetic Waxes |
| | Cardis 319[6] |
| | Petrolite C-7500[6] |
| | Petrolite C-400[6] |
| | Cardipol LP[6] |

[1] Hercules
[2] Neville
[3] Arizona
[4] Goodyear
[5] Exxon
[6] Barreco
[7] Eastman
[8] Durachem
[9] Witco
[10] Allied
[11] National Wax

What is claimed is:

1. A hot melt adhesive and coating composition comprising: a normally solid ethylene-acrylic acid or methacrylic acid copolymer characterized as falling within the boundries defined by Points A, B, D and E of the trapezoidal figure set forth in the Drawing, wherein Points A, B, D and E represent the following characteristics of the copolymer; A, a copolymer having an acid number of about 23 and a flow rate of about 0.77; B, a copolymer having an acid number of about 93 and a flow rate of about 69; D, a copolymer having an acid number of about 8 and a flow rate of about 69; and E, a copolymer having an acid number of about 8 and a flow rate of about 0.77; a compatable wax from about 10 to about 40 percent by weight and a compatable tackifier from about 10 to about 40 percent by weight wherein the composition is characterized by limited separation for at least about 24 hours when maintained at a temperature of about 120° C. to about 232° C.

2. The composition of claim 1 wherein the copolymer is an ionomer.

3. A hot melt adhesive and coating composition comprising: an ethylene-acrylic acid or methacrylic acid copolymer characterized as falling within the boundaries defined by Points A, C, D and E of the trapezoidal figure set forth in the Drawing wherein Points A, C, D, and E represent the following characteristics of the copolymer; A, a copolymer having an acid number of about 23 and a flow rate of about 0.77; C, a copolymer having an acid number of about 65 and a flow rate of about 69; Point D, a copolymer having an acid number of about 8 and a flow rate of about 69; and E, a copolymer having an acid number of about 8 and a flow rate of about 0.77; a compatable wax from about 10 to about 40 percent by weight and a compatable tackifier from about 10 to about 40 percent by weight, wherein the composition is characterized by limited separation for at least about 24 hours when maintained at a temperature of about 120° C. to about 232° C.

4. The composition of claim 3 wherein the copolymer is an ionomer.

5. A laminate comprising two substrates bonded together with the composition of claim 1.

6. A laminate comprising two substrates bonded together with the composition of claim 3.

7. A method of bonding two substrates together which comprises applying to the surface of at least one first substrate, the composition of claim 1 at a temperature ranging from about 93° to about 232° C., compressing to the first substrate in contact with the hot melt adhesive a second substrate and permitting the substrates to become bonded.

8. The method of claim 7 wherein the copolymer is an ionomer.

9. A method of bonding two substrates together which comprises: applying to the surface of at least one first substrate, the composition of claim 3 at a temperature ranging from about 93° to about 232° C., compressing to the first substrate in contact with the hot melt adhesive composition a second substrate and permitting the substrates to become bonded.

10. The method of claim 9 wherein the copolymer is an ionomer.

11. The method of claim 9 wherein the substrates are of like materials.

12. The method of claim 9 wherein the substrates are of dislike materials.

13. A laminate comprising a solid substrate having bonded thereto a uniform layer of the composition of claim 3.

14. A laminate comprising a solid substrate having bonded thereto a uniform layer of the composition of claim 4.

* * * * *